(12) United States Patent
Duane

(10) Patent No.: US 9,678,548 B1
(45) Date of Patent: Jun. 13, 2017

(54) POWERING SECURITY DEVICES

(71) Applicant: EMC Corporation, Hopkinton, MA (US)

(72) Inventor: William M. Duane, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 395 days.

(21) Appl. No.: 13/731,461

(22) Filed: Dec. 31, 2012

(51) Int. Cl.
| | |
|---|---|
| G06F 1/26 | (2006.01) |
| H04W 12/06 | (2009.01) |
| G06F 21/31 | (2013.01) |
| F25B 21/02 | (2006.01) |

(52) U.S. Cl.
CPC ............. G06F 1/26 (2013.01); G06F 21/31 (2013.01); H04W 12/06 (2013.01); F25B 21/02 (2013.01)

(58) Field of Classification Search
CPC .......... G06F 1/26; G06F 21/31; H04W 12/06; F25B 21/02
See application file for complete search history.

(56) References Cited

U.S. PATENT DOCUMENTS

| | | | | |
|---|---|---|---|---|
| 7,268,517 | B2* | 9/2007 | Rahmel et al. | 320/101 |
| 7,552,467 | B2* | 6/2009 | Lindsay | 726/5 |
| 8,035,335 | B2* | 10/2011 | Duron et al. | 320/101 |
| 8,786,435 | B2* | 7/2014 | Barnett et al. | 340/541 |
| 9,135,620 | B2* | 9/2015 | Chen | G06Q 20/204 |
| 9,185,109 | B2* | 11/2015 | Chen | H04L 63/0492 |
| 2004/0178517 | A9* | 9/2004 | Siu | F25B 21/02 257/706 |
| 2007/0117596 | A1* | 5/2007 | Greene et al. | 455/572 |
| 2009/0174361 | A1* | 7/2009 | Duron et al. | 320/101 |
| 2009/0259588 | A1* | 10/2009 | Lindsay | 705/40 |
| 2010/0030695 | A1* | 2/2010 | Chen | G06Q 20/204 705/67 |
| 2010/0091995 | A1* | 4/2010 | Chen | H04L 63/0492 380/278 |
| 2010/0277126 | A1* | 11/2010 | Naeimi et al. | 320/137 |
| 2012/0112828 | A1* | 5/2012 | Richter et al. | 327/564 |
| 2013/0265140 | A1* | 10/2013 | Gudan | G06K 7/10207 340/10.3 |

* cited by examiner

Primary Examiner — M Elamin
(74) Attorney, Agent, or Firm — Krishnendu Gupta; Jason A. Reyes

(57) ABSTRACT

A method is used in powering security devices. Power is derived from ambient energy in the vicinity of a mobile security device. The power is caused to be used for security based computing tasks within the mobile security device.

12 Claims, 1 Drawing Sheet

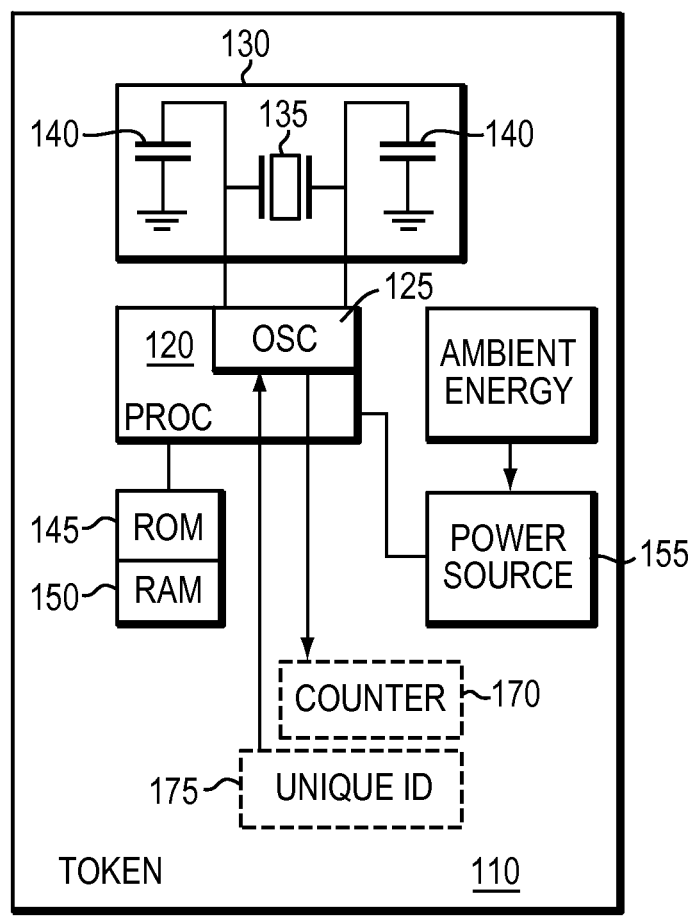

POWERING SECURITY DEVICES

BACKGROUND OF THE INVENTION

Computer networks, and in particular Wide Area Networks (WANs) such as the Internet, provide opportunities for the misuse and abuse of communications traveling thereover. For example, two users (e.g., a human user and an enterprise server) communicating via the WAN may have their communications intercepted and/or altered. Also, it is possible for one user to misrepresent his, her, or its identity to another user.

Thus, there is a need for both privacy and authentication between users of the network communicating with one another. In other words, users should be able to rely on the fact that their transmissions will not be intercepted or altered, and that transmissions from someone purporting to be a particular user do in fact originate from that user.

In many secure communication applications, a seed is required in order to perform certain cryptographic operations such as encryption, decryption, authentication, etc. The seed may comprise, by way of example, a symmetric key or other secret shared by two or more entities.

One such application is in authentication tokens, such as the RSA SecurID® authentication token commercially available from RSA, The Security Division of EMC, of Bedford, Mass., U.S.A. ("RSA Security") The RSA SecurID® authentication token is used to provide two-factor authentication. Authorized users are issued individually-registered tokens that generate single-use token codes, which change based on a time code algorithm. For example, a different token code may be generated every 60 seconds. In a given two-factor authentication session, the user is required to enter a personal identification number (PIN) plus the current token code from his or her authentication token. This information is supplied to an authentication entity. The authentication entity may be a server or other processing device equipped with RSA ACE/Server® software, available from RSA Security. The PIN and current token code may be transmitted to the authentication entity via an encryption agent equipped with RSA Authentication Manager software, also available from RSA Security. If the PIN and current token code are determined to be valid, the user is granted access appropriate to his or her authorization level. Thus, the token codes are like temporary passwords that cannot be guessed by an attacker, with other than a negligible probability.

Authentication tokens and other security devices are examples of modern mobile computing devices that include advanced logic devices that have power consumption characteristics.

Many efforts of research and development are dedicated to increasing the life and performance of rechargeable batteries for mobile computing devices. There are known tools in the market that provide recharging of batteries for mobile electronic devices. For example, there are devices that are capable of recharging the battery of electronic devices by converting the solar energy to electrical energy.

Presently, there are certain devices available that use relatively high frequency and/or impact energy to charge batteries or capacitors. Energy pulses from these devices may be at significant voltage levels and may be converted into useable charge energy with simple rectification.

SUMMARY OF THE INVENTION

A method is used in powering security devices. Power is derived from ambient energy in the vicinity of a mobile security device. The power is caused to be used for security based computing tasks within the mobile security device.

These and other features and advantages of the present invention will become more readily apparent from the accompanying drawings and the following detailed description.

BRIEF DESCRIPTION OF THE DRAWINGS

FIG. 1 is a block diagram of an example system for use with the technique described herein.

DETAILED DESCRIPTION

Described below is a technique for use in powering security devices. In at least one implementation, the technique may be used to help provide, among other things, for energy harvesting to power security tokens.

In particular, the technique may be used to help provide for security tokens to be powered through energy harvesting processes. In the energy harvesting processes, power is derived from the environment for the use of the security token. Examples of these energy harvesting processes include harvesting of ambient radio frequency signals, harvesting of light energy hitting the token, harvesting of heating caused by a user holding or carrying a device, and harvesting of energy created when users move or press buttons on a device.

Conventionally, hand held security token devices are powered by one or more batteries present in the devices.

By contrast, in at least some implementations based on the technique described herein, by the use of energy harvesting processes, the battery may be totally eliminated from the security devices, or such battery may at least be reduced in size, which may also mitigate or eliminate an environmental impact of these security devices. In addition, the lifetime of such security devices need not be determined by the lifetime of a battery since power can be drawn from the environment as long as needed. Further, such implementations have more flexibility in the design of tokens, including the shape of the token, the size of the token, and the physical flexibility or mold-ability of the token since a battery is not present, or is at least substantially reduced in size.

FIG. 1 illustrates an example of a security device, i.e., a token 110 for use with the technique. It is to be appreciated, however, that token 110 is merely an example implementation, and the invention is not restricted to use in this or any other particular system configuration.

In the example implementation, token 110 includes a processor 120 having an oscillator section 125 driven by a crystal circuit 130 that includes a crystal 135 and capacitors 140. The processor has or is connected to read only memory (ROM) 145 containing firmware instructions for the processor, and has or is connected to read-write memory (RAM) 150. The processor is powered by a power source 155 as described below. Depending on the implementation, the token may or may not have a counter 170 driven by the oscillator section, and/or a unique identification number such as processor's unique identifier 175. (In another example implementation, e.g., for an event-synchronous token, a simple RC (resistor-capacitor) driven oscillator may be adequate—and in some cases the oscillator is entirely internal to the microprocessor.)

Operationally, as a security device in a security system, token 110 may function as described in one or more of the following U.S. patents, which are hereby incorporated by reference herein.

U.S. Pat. No. 7,716,484 System and method for increasing the security of encrypted secrets and authentication U.S. Pat. No. 7,562,221 Authentication method and apparatus utilizing proof-of-authentication module U.S. Pat. No. 7,502,933 Identity authentication system and method U.S. Pat. No. 7,502,467 System and method for authentication seed distribution U.S. Pat. No. 7,363,494 Method and apparatus for performing enhanced time-based authentication U.S. Pat. No. 7,359,507 Server-assisted regeneration of a strong secret from a weak secret U.S. Pat. No. 7,111,172 System and methods for maintaining and distributing personal security devices U.S. Pat. No. 6,985,583 System and method for authentication seed distribution U.S. Pat. No. 6,189,098 Client/server protocol for proving authenticity U.S. Pat. No. 6,130,621 Method and apparatus for inhibiting unauthorized access to or utilization of a protected device U.S. Pat. No. 6,085,320 Client/server protocol for proving authenticity Power source 155 may have characteristics as described below. In general, the technique described herein may be used in energy harvesting to power security tokens, wherein the energy harvesting processes derive power from the environment or the use of the security token. Examples of these energy harvesting processes include harvesting of ambient radio frequency signals, harvesting of light energy hitting the token, harvesting of heating caused by a user holding or carrying a device, and harvesting of energy created when the user moves or presses buttons on a device.

Security tokens, including hand held one time passcode (OTP) devices such as the SecurID token, need a power source to operate the electronics contained within the token. Conventionally the most common way these devices are powered is via the use of a battery, e.g., one or more lithium ion batteries referred to as coin cells. These coin cells work well for this token application, but the coin cells utilize precious metals which are increasing in cost, and which can be environmentally damaging when disposed. Conventionally, tokens are sealed units, typically filled with epoxy, and are specifically designed so that their batteries cannot be removed (for security reasons). As a result, conventionally the lifetime of a security token is constrained by the amount of power and lifetime of the battery, the size and shape of the token is impacted by the presence of the battery, and the battery is not easily removable to allow separate recycling of the token and the battery. Conventionally these issues are compounded since there are millions of these devices are in use today, and eventually all of these devices will be disposed.

In the case of a conventional security token, e.g., a SecurID SID700 token from RSA, The Security Division of EMC, of Bedford, Mass., U.S.A., the token has a rounded end attached to a part that contains an LCD display and is more rectangular, and the rounded end contains a lithium battery. Conventionally, a significant portion a coin cell battery has a significant impact on the shape and size of the SecurID SID700 device.

In addition, conventional hand held security devices draw power from an attached battery in order to perform cryptographic computations needed to perform their security function. Since batteries have a finite amount of power stored within them, this set a limit on the lifetime of the conventional security devices.

Further, the batteries in these conventional security devices often contain rare metals such as lithium or cadmium, and contain various chemicals used as electrolytes. In at least some cases these metals and electrolytes may be dangerous to the environment, and as a result, these batteries have special handling and disposal requirements so that the rare metals can be reclaimed and the dangerous chemicals can be rendered safe.

Conventional security tokens are typically manufactured as sealed units which do not have replaceable batteries, and this may be done to help prevent tampering with the device, or attacks such as power related side-channel attacks.

These battery related issues of size, limited power, and inability to recycle the batteries drive towards solutions based on the technique described herein which may help to reduce the size of, or entirely eliminate the battery in such devices.

In at least some implementations based on the technique described herein, energy harvesting processes are used to obtain power from the environment around the token, or from the use of the security token, and thereby help to eliminate or reduce the dependence on a battery for power.

One or more of several processes may be used in this energy harvesting:
  Ambient radio frequency (RF) signals in the area of the security token
  Light impinging on the security token
  Physical movement of the token
  Pressing of buttons on the token
  Physical flexing of the token
  Exposure to heat from the user carrying the token in a pocket, from the user's hand, or from other temperature differences in the environment
  These processes are discussed briefly below.

At least some of the energy harvesting processes have the characteristic of generating very small amounts of power, which are insufficient to power a security token directly for a lengthy period. However, security tokens can enter a low power state, or totally off state, when they are not being used, and SecurID time-based security tokens spend most of their time in a low-power sleep mode. Thus, an energy harvesting token based on the technique described herein can slowly and continuously gather a trickle of power from the environment and store that power for later use, so that when the token wakes up and needs the power for a brief period, the power is available for the token to use.

With respect to ambient RF, ambient radio frequency signals are present in almost any environment where a token is used. These signals may be from a variety of sources including but not limited to:
  Cellular phones in the vicinity, and nearby cellular towers.
  Wireless communications signals such as WiFi from nearby access points, notebook computers, smart phones, and tablets.
  Bluetooth signals from phones, Bluetooth headsets, Bluetooth keyboards, notebook computers, tablet computers, and hands-free systems in cars
  Cordless phones
  AM radio stations, FM radio stations, TV transmitters.
  Other low power transmissions, such as ISM band transmissions (e.g., wireless thermometers and weather stations), GMS and GPS satellite signals, and atomic time signals.
  Appliances such as microwave ovens can leak radio frequency power which may be used for energy harvesting.

At least one implementation based on the technique described herein has a power source 155 that includes a circuit that receives these ambient RF signals and rectifies them into a weak power source. There are several methods by which this power may be generated, and the token may have several circuits, each with a separate antenna and tuned circuit which targets a specific frequency band.

In at least some implementations, the circuit is not directed to retrieving any data contained within the signal, but rather is only for using the signal as a power source. It is likely that many different signals which are close in frequency can be received at the same time and used for power extraction. For example, Bluetooth, some microwave ovens, and some 802.11 systems all operate within the 2.4 Ghz radio frequency band. A receiver configured to receive any signals in this band may pick up any of these signals and convert them to power regardless whether or not they are modulated or encoded differently.

An alternative and, in at least some cases, preferred embodiment is to use an antenna that can receive multiple frequencies at the same time, such as a system utilizing a fractal antenna, and feed this broad range of signals into a circuit that can indiscriminately rectify these signals into a power source.

At least some implementations may use a rectenna, which is a device that can convert RF energy (e.g., microwave energy) directly into usable power. Conventionally, rectennal technology is used in an RFID tag to gather power from a specialized transmitter to power an RFID chip in the tag.

In at least some cases, the power expected to be gathered from ambient RF may not sufficient to be directly interfaced to the security token for effective power. In such cases, power conditioning electronics may be used to gather this power, transform the gathered power as needed, and then store the gathered power in a storage device. These storage devices may be capacitors, ultra capacitors, batteries, or some combination thereof.

With respect to ambient light, since during operation a security token needs to be taken out and read, some amount of light hits the token so that the token's LCD display can be read. Often, security tokens are placed on desktops or on the top of a computer system such as a notebook computer in a home or office environment.

In these cases very small amounts of power are generated from light striking the token, and this may be done in any of several ways. First, the case of the token may be made from a material that generates small amounts of electricity when light hits the case. Second, the LCD display may have a solar cell located behind the display which can gather small amounts of power when light strikes the security token. If the security token has sufficient space, a separate dedicated solar cell may be included in the token to generate power when light strikes the token.

As in the ambient RF solution above, this small amount of light-generated power may be conditioned and stored for later use.

With respect to ambient heat, it is possible to gather small amounts of power from differences in temperature. One such example is the heat generated by the human body. When a user keeps a token in the user's pocket, or holds the token in the user's hand, some amount of heat from the user's body flows through the token and is radiated away from the token on the opposite side.

There are other cases where a heat difference can cause heat to flow through a token. For example, security tokens are often placed on top of a notebook computer leaning on the LCD display. Notebook computers generate a significant amount of heat from the processor, hard drive, and LCD panel backlight, and at least one of these can heat one side of a token causing a heat flow which can be captured to generate power.

Another example is a token placed on the dashboard of a car, which can heat up.

This flow of heat can be used to generate electricity. There are a number of ways of generating heat from electricity, including thermocouples or similar uses of dis-similar metals. In at least some cases, a preferred way of using heat to generate power for a security token is to include a Peltier (or Seebeck) device in the token to generate the power. Peltier devices are semiconductor devices which can be used to generate power if a temperature difference exists between the two sides of the device. In a security token, one or more Peltier devices may be included in such a way that the Peltier device faces are connected to opposite sides of the security token. That way, if one side of the security device is warmer than the other (e.g., because it is in a pocket), the flow of heat through the security device flows through the Peltier device, generating power.

As above, this power is conditioned and stored for later use.

With respect to piezoelectric energy harvesting, piezoelectric crystals have the property that when the crystal structure is stressed (typically by bending or applying pressure) the crystal releases electric current. A common use for piezoelectric crystals is in sparkers to ignite grills, butane lighters, or stoves.

Piezoelectric devices may be used in a number of ways to generate power for use in security devices such as security tokens. Some examples include:

- Associating a piezoelectric device with a button such that pressing the button generates power. The button may also perform other functions such as turning the device on, or requesting a new authentication code, in addition to generating power.
- Associating a weight with a piezoelectric device such that when the device moves, the weight causes the piezoelectric device to generate power. Where such a device is embedded within a security token, various movements such as walking with the token in a pocket or purse, lifting or setting down a token, or rotating a token may cause the generation of power.
- If a piezoelectric device is connected to a membrane which can pick up sounds, the vibration of the membrane stresses the piezoelectric device, causing power to be generated from ambient sound or noise.
- If a security token has a piezoelectric device attached to its case, any flexing of the case causes the generation of power.

Note that piezoelectric devices have some characteristics that distinguish them from at least some other energy harvesting devices. Notably piezoelectric devices generate relatively high voltages when stressed, and piezoelectric devices generate voltage of one polarity when the stress is applied and voltage of the opposite polarity when the stress is removed. As a result, the power conditioning circuitry needs to deal with high voltages, and with inputs of either polarity. As a result, and similarly to the other energy harvesting solutions, these devices need power conditioning and power storage devices to properly provide the required power to security tokens.

With respect to other sources, the energy harvesting power sources described above are examples only, since there are other ways to perform energy harvesting, including induction of ambient magnetic fields, and magnetically based motion generators. Some MEMS devices have been proposed as energy harvesting devices and may apply as well.

One or more implementations based on the technique described herein may have one or more of the following characteristics.

Multiple energy harvesting processes may be used in the same security token.

The energy harvested may be used to re-charge a smaller token battery, and this rechargeable battery may be used as the energy storage device.

An ultracapacitor, alone or in parallel with a regular capacitor and/or battery, may be used. In at least some cases it may be advantageous to use the ultracapacitor in parallel with a regular capacitor and/or battery because the internal resistance (ESR) of the regular capacitor and/or battery may be less than that of the ultracapacitor. This allows the energy conditioning circuit to feed the weak power into the regular capacitor and/or battery more easily, while it can then slowly charge the ultracapacitor from the regular capacitor and/or battery.

In a first sample use case, a security token has energy harvesting utilizing a 2 Ghz antenna. In this use case, the security token includes an antenna tuned to receive frequencies around the 2 Ghz frequency band, which includes some 802.11 wireless frequencies, Bluetooth frequencies, some wireless phone frequencies, some ISM band device frequencies, and emissions from some microwave ovens.

These ambient signals are received by the antenna, and a low power rectification and power conditioning circuit which converts the RF energy into low power direct current. This low power direct current is optionally directed into a DC to DC converter and then stored in a storage device such as an ultracapacitor. The harvested power is accumulated by the ultracapacitor until the security device wakes up and starts using the power to execute computing tasks, such as a cryptographic process, wherein the power needed to operate the security token is drawn from the ultracapacitor. Subsequently the power drawn out of the ultracapacitor is slowly replaced by energy harvesting the ambient 2 Ghz signal present in the environment.

In a second use case, a security token has thermal energy harvesting. In this use case, the security token includes a set of Peltier devices wherein one side is connected to the top face of the token, and the other side is connected to the bottom face of the token. In this use case, the top and bottom faces are preferably made of metal, and a small insulating band is provided between the top and bottom metal faces.

During the course of the day, the security token is placed in a number of locations where a temperature difference exists between the top and bottom face of the token. One example is when the security token is placed in a pocket on a person. The face closest to the skin is warmer than the face furthest from the skin. Another example is when the token is resting against the top of an operating notebook computer. The face touching the notebook computer is warmer than the opposite face.

When there is a temperature difference between the faces, the Peltier devices generate a small amount of power roughly proportional to the temperature difference. This power continues to be generated as long as a temperature difference exists between the two faces. The resulting power is conditioned by the energy conditioning circuitry, and then directed to the energy storage device such as a battery in parallel with a capacitor and/or battery.

The harvested power is accumulated by the capacitor and/or battery until the security device wakes up and starts using the power to execute computing tasks, such as a cryptographic process, wherein the power needed to operate the security token is drawn from the capacitor and/or battery. The power drawn out of the capacitor and/or battery is slowly replaced by energy harvesting due to temperature differences across the two faces of the token.

In the case of a time based token, since the token needs access to an accurate indication of the current time, such an indication may be made available in one of at least two ways: by constantly powering a timekeeping device within the token, or by detecting the current time. In the first way, a capacitor or battery charged up by ambient energy as described above may be used to power the timekeeping device. In the second way, the token may include a time detection device that detects the current time from external sources such as atomic time signals, GPS signals, and/or cell phone signals. With respect to the first way, the token may consume a very small amount of power constantly, to power the timekeeping device. With respect to the second way, in at least some implementations, the token need not consume any power or any significant power on a constant basis.

With respect to use of ambient energy, the source upon which a token is directed to rely may depend on the expected environment of the token. For example, if the token is expected to be used where WiFi signals or similar signals are present, the token may rely for power on frequencies used by WiFi. In another example, if the token is expected to be used where vibrations or other physical movements are common, the token may rely on physical movement for power.

Use of the technique described herein may also enhance security of security tokens. For example, charging and discharging may introduce more changes to patterns of power use within the token and may make it more difficult to mount successful side channel attacks on the token. In another example, tokens may be made without batteries and may be made extremely difficult to open, since it is unnecessary to allow for an ability to reclaim embedded batteries for recycling or disposal purposes.

The term device or computer as used herein refers generally to any processor-based equipment or system capable of implementing at least a portion of the technique as described herein.

Token 110 may be, be included in, or include, by way of example and without limitation, a computer, a mobile telephone, a personal digital assistant (PDA), a smart card, an authentication token, a server, and/or various portions or combinations of these and other processing devices. Token 110 may thus be implemented as otherwise conventional processing devices programmed by software and/or firmware to perform portions of the technique as described herein. Conventional aspects of such equipment are well known to those skilled in the art, and are therefore not described in detail herein.

In an example implementation, the token comprises or is otherwise associated with an authentication token, such as an RSA SecurID® authentication token. However, the technique is adaptable in a straightforward manner to a wide variety of other cryptographic processing devices.

Details regarding certain conventional cryptographic techniques suitable for use in conjunction with the present invention may be found in, e.g., A. J. Menezes et al., Handbook of Applied Cryptography, CRC Press, 1997, which is hereby incorporated by reference herein.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for use in powering security devices, the method comprising:
    deriving power from ambient energy in the vicinity of a mobile security device, the mobile security device comprising a Peltier device arranged with respect to the mobile security device such that one side of the Peltier device is connected to one face of the mobile security device and another side of the Peltier device is connected to another face of the mobile security device;
    utilizing the derived power to power a timekeeping device within the mobile security device or detect time from an external source; and
    performing a cryptographic operation within the mobile security device by using a time obtained from the timekeeping device or the external source to generate a code for use in authentication;
    wherein deriving power from ambient energy in the vicinity of a mobile security device, comprises:
    receiving heat on the one side of the Peltier device connected to the one face of the security device;
    based on a temperature difference between the faces, generating an amount of power proportional to the temperature difference; and
    storing the generated power in a storage device within the mobile security device such that the power required to perform at least part of the cryptographic operation within the mobile security device is drawn therefrom.

2. The method of claim 1, wherein the ambient energy is used for energy harvesting to power security tokens.

3. The method of claim 1, wherein using the power for security based computing provides an environmental disposal related benefit to the mobile security device.

4. The method of claim 1, wherein the mobile security device is at least primarily powered by the power derived from the ambient energy.

5. The method of claim 1, wherein the mobile security device is smaller than an operationally identical mobile security device having a battery.

6. The method of claim 1, wherein the mobile security device has more physical flexibility than an operationally identical mobile security device having a battery.

7. A system for use in powering security devices, the system comprising:
    first logic deriving power from ambient energy in the vicinity of a mobile security device, the mobile security device comprising a Peltier device arranged with respect to the mobile security device such that one side of the Peltier device is connected to one face of the mobile security device and another side of the Peltier device is connected to another face of the mobile security device;
    second logic utilizing the derived power to power a timekeeping device within the mobile security device or detect time from an external source; and
    third logic performing a cryptographic operation within the mobile security device by using a time obtained from the timekeeping device or the external source to generate a code for use in authentication;
    wherein deriving power from ambient energy in the vicinity of a mobile security device, comprises:
    receiving heat on the one side of the Peltier device connected to the one face of the security device;
    based on a temperature difference between the faces, generating an amount of power proportional to the temperature difference; and
    storing the generated power in a storage device within the mobile security device such that the power required to perform at least part of the cryptographic operation within the mobile security device is drawn therefrom.

8. The system of claim 7, wherein the ambient energy is used for energy harvesting to power security tokens.

9. The system of claim 7, wherein using the power for security based computing provides an environmental disposal related benefit to the mobile security device.

10. The system of claim 7, wherein the mobile security device is at least primarily powered by the power derived from the ambient energy.

11. The system of claim 7, wherein the mobile security device is smaller than an operationally identical mobile security device having a battery.

12. The system of claim 7, wherein the mobile security device has more physical flexibility than an operationally identical mobile security device having a battery.

* * * * *